April 14, 1931.  G. H. REINERS  1,800,659
TRACTOR ATTACHMENT
Filed March 26, 1928  2 Sheets-Sheet 2
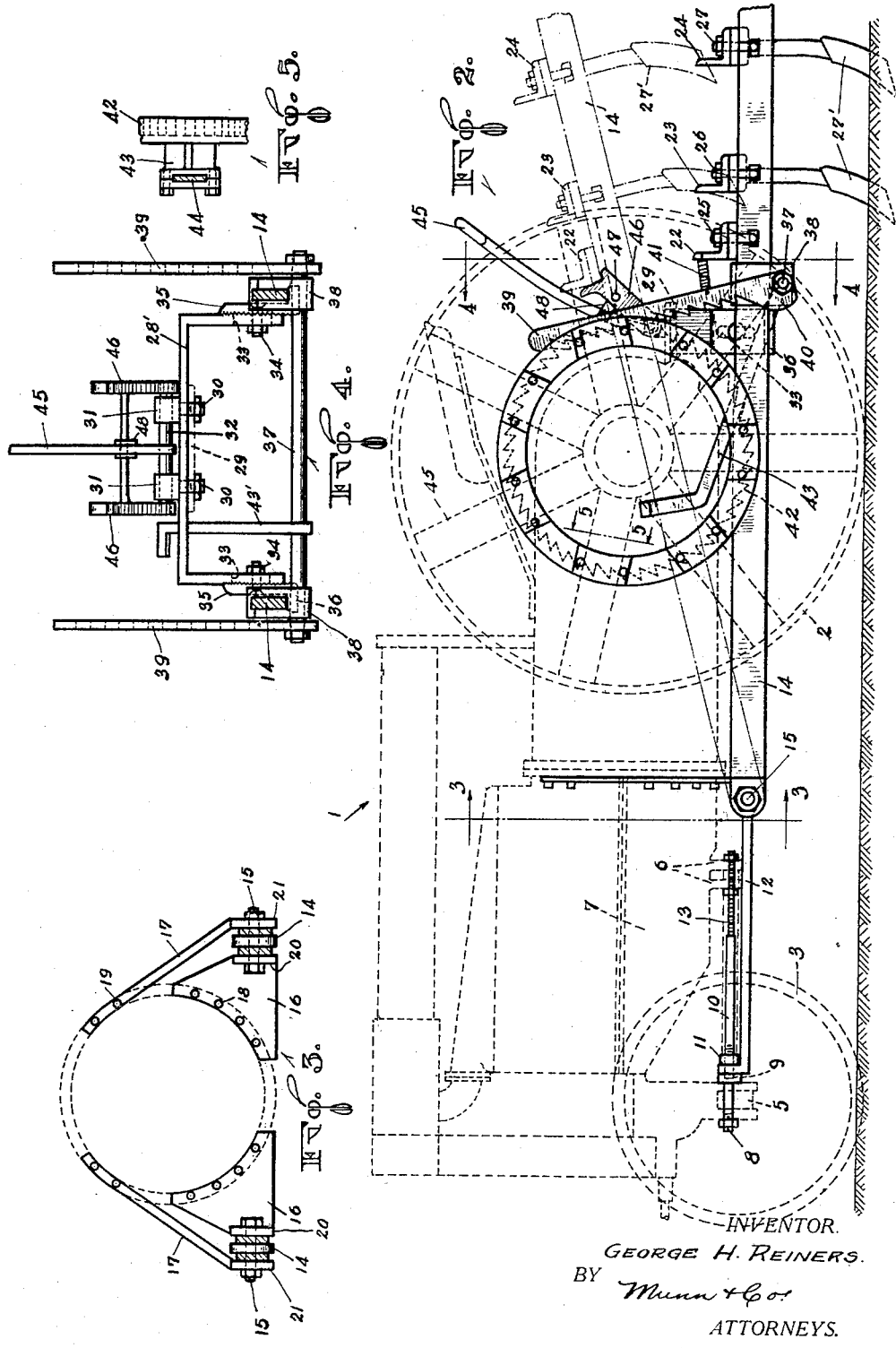
INVENTOR.
GEORGE H. REINERS.
BY Munn & Co.
ATTORNEYS.

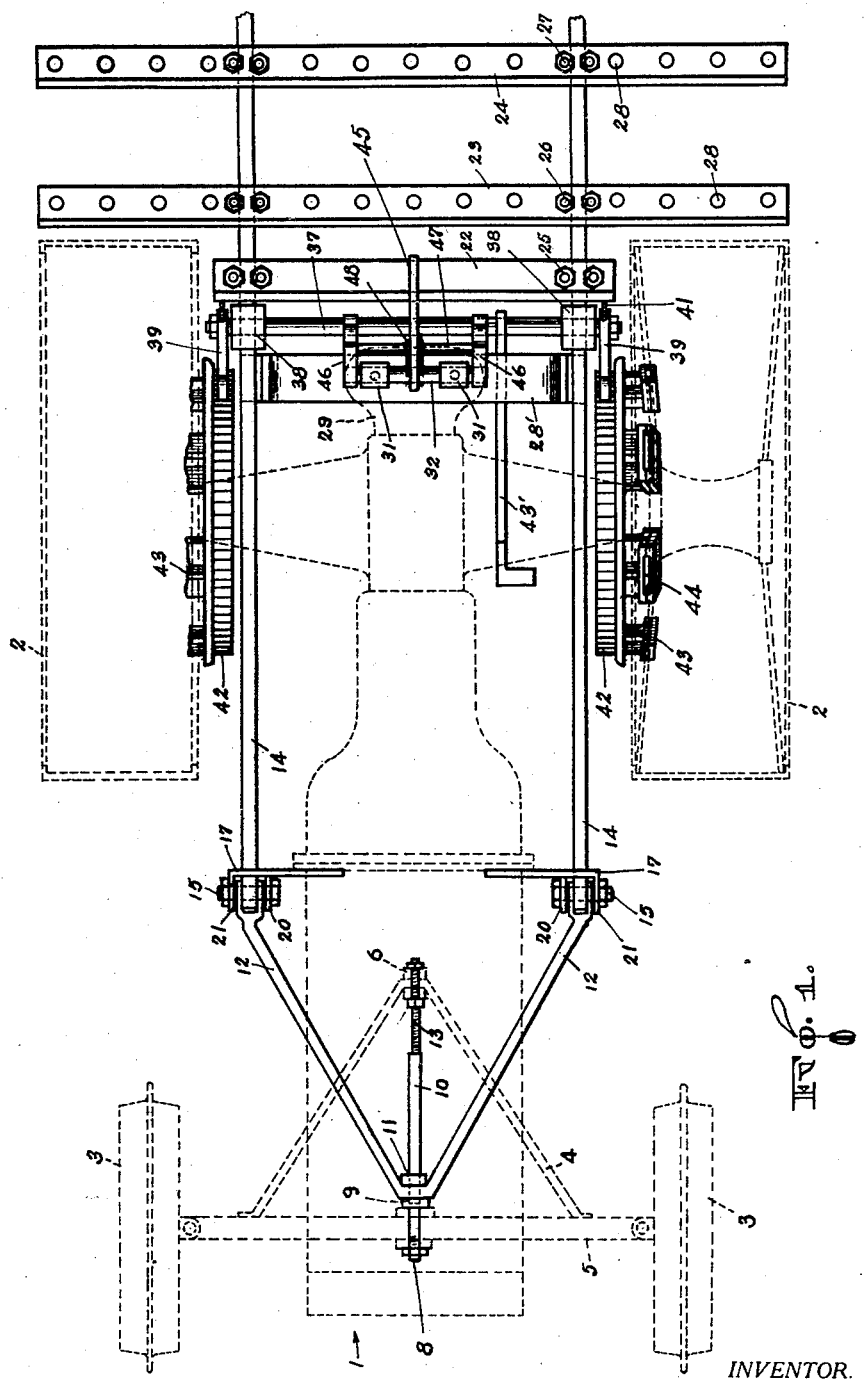

Patented Apr. 14, 1931

1,800,659

UNITED STATES PATENT OFFICE

GEORGE H. REINERS, OF UKIAH, CALIFORNIA

TRACTOR ATTACHMENT

Application filed March 26, 1928. Serial No. 264,773.

My invention relates to improvements in tractor attachments, and it consists in the combinations, constructions, and arrangements hereinafter described and claimed.

An object of my invention is to provide a tractor attachment which is to be used for ploughing, cultivating, listing, sub-soiling, et cetera, and which is designed to be quickly attached to a standard tractor with but slight alterations being necessary in the latter.

The device, when secured to the tractor, makes a single unit therewith and permits the tractor to be turned around in a smaller space than is usually the case when the attachment is supported by a separate carriage. The device can be quickly removed, permitting the tractor to be used for other purposes.

Other objects and advantages will appear in the following specification, and the novel features of my invention will be particularly pointed out in what I hereinafter claim.

My invention is illustrated in the accompanying drawing forming a part of this application, in which:

Figure 1 is a top plan view of the device shown operatively applied to a standard tractor;

Figure 2 is a side elevation;

Figure 3 is a section along the line 3—3 of Figure 2;

Figure 4 is a section along the line 4—4 of Figure 2; and

Figure 5 is a section along the line 5—5 of Figure 2.

In carrying out my invention I make use of a standard tractor indicated generally at 1. This tractor is provided with rear wheels 2, front wheels 3, and the usual radius rods 4. The rods extend from the front axle 5 to lugs 6 that depend from the bottom of the crank case 7.

In attaching my device I provide a different king-bolt 8 for securing the front axle 5 in place. This king-bolt has a recess 9 in its head and this recess receives the front end of a rod 10, see Figure 1. The rod has an enlarged portion 11 that bears against a wish-bone 12 of the shape shown. The rod 10 has a threaded portion 13 that extends through the lugs 6 and connects the radius rods 4 in place. In this way the rod takes the place of the usual pin that secures the radius rods to the lugs.

The arms of the wish-bone 12 act as a connecting means between the frame of the device and the tractor. The frame consists of a pair of bars 14 that are pivotally secured at 15 to the ends of the wish-bone 12. Any pull upon the bars 14 will therefore be transmitted to the king-bolt 8, the axle 5, lugs 6, and radius rods 4. This construction gives a very firm connection and no undue strain is placed upon any particular part of the tractor.

In addition to this connecting mechanism I provide plates 16 and 17 of the shape shown in Figure 3. These plates are secured to the tractor by the same bolts 18 and 19 that are used in securing the parts of the tractor together. I have shown two sets of four bolts, each designated by the reference numeral 18 for locking the plates 16 to the tractor, and have shown two sets of two bolts, each designated by the reference numeral 19 for securing the plates 17 in place. The plates 16 and 17 have ears 20 and 21 that straddle the ends of the wish-bone 12. The connecting bolts 15 pass through these ears and the bolts are therefore fixed with respect to the tractor and act as pivots for a purpose hereinafter described.

At the back of the bars 14 I show a plurality of angle irons 22, 23, and 24. These angle irons are secured to the bars by adjustable U-shaped bolts 25, 26, and 27, and carry ground digging tools 27'. Openings 28 are provided in the angle irons 23 and 24 for permitting the tools to be spaced at any desired point along the members. Normally, the bars 14 are in a horizontal position, shown in Figure 2, and the tools 27 are partially imbedded in the ground. The bars are prevented from dropping further by the mechanism shown in Figure 4.

A U-shaped bracket 28' is carried by a draw-bar 29 that forms a standard part of the tractor. Bolts 30 are passed through openings in the draw-bar and in the bracket, and these bolts have enlarged heads 31 that constitute bearings for a shaft 32. The purpose of the shaft will be described later. The legs of the bracket have slots 33 therein and in these slots I dispose bolts 34. Hangers 35 are secured to the legs of the bracket 28' by the bolts 34, and these hangers are adjusted vertically and are held in adjusted position by the bolts. The abutting surface between the bracket and the hangers may be roughened, as shown. The hangers have outwardly extending portions 36 upon which the bars 14 rest.

The mechanism for raising the tools into inoperative position is controlled at the will of the operator. I show this mechanism in Figures 1, 2, and 4. Reference to Figure 1 shows a shaft 37 that lies between the angle iron 22 and the bracket 28'. This shaft is journalled in castings 38, which in turn are secured to the bars 14. At each end of the shaft 37 I rigidly mount a pawl 39 so that a rocking of the shaft will swing the pawls. Each pawl has a plurality of teeth fashioned therein, see Figure 2, and a cam surface 40. Springs 41 connect the pawls with the angle iron 22 and urge the pawls into inoperative position, i. e., into a position to free a ratchet 42.

A foot pedal 43' is connected to the shaft 37, and when this is depressed by the operator the pawls 39 are moved into engagement with the ratchet 42. A turning of the ratchet will raise the bars 14 into the dotted line position shown in Figure 2.

It might be well at this point to state that there are two ratchets 42 and these carry projections 43, see Figures 1 and 5, that have openings 44 for receiving the spokes 45 of the tractor wheels 2. In this way the ratchets are rigidly secured to the tractor wheels and rotate therewith.

Means are also provided for supporting the bars 14 in raised position. As soon as the bars reach the dotted line position shown in Figure 2, the cams 40 of the pawls 39 engage with the ratchets 42 and swing the teeth of the pawls away from the teeth of the ratchets. This frees the bars 14 from the ratchets. Prior to this movement the operator actuates a lever 45, see Figures 1, 2, and 4, and moves it in a clockwise direction when looking at Figure 2. The lever is carried by the shaft 32, previously mentioned. Catches 46 of the shape shown in Figure 2 rotate upon the outer ends of the shaft 32. These catches are outwardly connected to the lever 45 by means of a pin 47 and links 48. The links in turn are pivotally secured to the lever 45.

An upward movement of the lever 45 will swing the catches beneath the angle iron 22, and thus support the bars 14 in raised position.

From the foregoing description of the various parts of the device, the operation thereof may be readily understood.

The tractor can be used in the usual manner and the tools 27 will dig into the ground so long as the bars 14 remain in a horizontal position. When the operator wishes to raise the tools he merely depresses the foot pedal 43' and throws the pawl 39 into engagement with the ratchets 42. Further rotation of the tractor wheels 2 will raise the bars and the bars can be held in raised position by means of catches 46.

The entire device forms an integral unit with the tractor, yet at the same time it may be quickly detached by merely loosening the two sets of four bolts 18. The device is extremely simple in construction and durable and efficient for the purpose intended.

Although I have shown and described one embodiment of my invention, it is to be understood that the same is susceptible of various changes and I reserve the right to employ such changes as may come within the scope of the invention as claimed.

I claim:

1. In combination, a tractor of the type in which the power plant is disposed adjacent to the front wheels, and the transmission disposed between the power plant and the rear wheels, of a tractor attachment secured to the front of the tractor, and ground-digging members carried by said attachment and being disposed in back of said tractor, said tractor attachment including a V-shaped member having its apex secured to the front axle and its arms secured to the sides of the tractor, and a member extending from the apex to the wishbone of the tractor.

2. In combination, a tractor, a tractor attachment designed to extend from the front to the rear, the front of the attachment being secured to the midpoint of the tractor front axle, and also being secured to the sides of the tractor, thereby affording a three point connection, and ground-digging members carried by said attachment and being disposed in back of said tractor.

3. A tractor attachment having a V-shaped front end, the apex of the V being securable to the middle of the tractor front axle, a bracing bar forming a part of the attachment and extending from the apex to the tractor wishbone, the ends of the V being secured to the sides of the tractor, and ground-digging members being carried by the rear of the attachment and being designed to lie in back of the tractor.

4. In a tractor attachment, pivotal arms, diggers carried by said arms, ratchets securable to tractor wheels and being turned thereby, a pawl carried by each arm, each pawl having a plurality of teeth, manually-controlled means for swinging said pawls into operative engagement with said ratchets whereby the arms will be lifted and manually controlled means for engaging with the pawls for supporting them in raised position.

GEORGE H. REINERS.